J. Noble,
Cotton Comb.
Nº 11,199. Patented June 27, 1854.
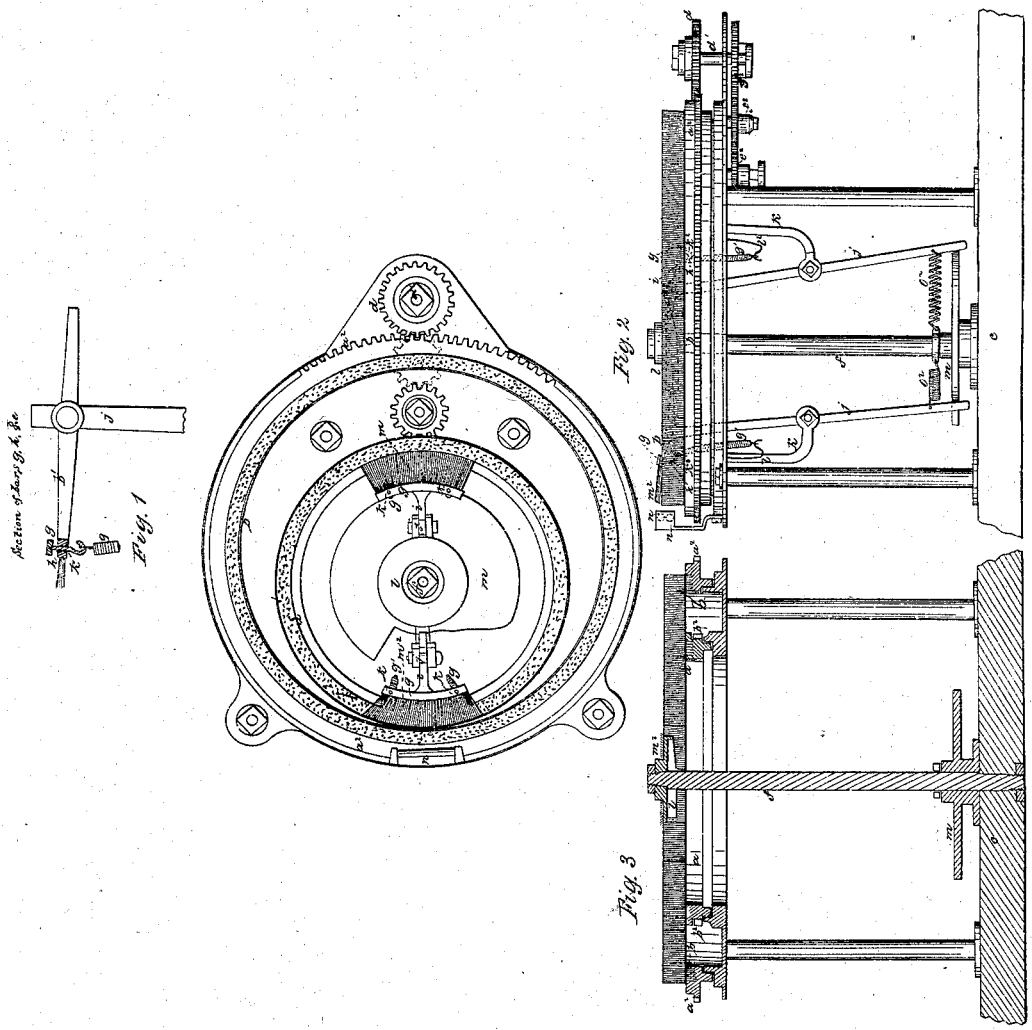

UNITED STATES PATENT OFFICE.

JAMES NOBLE, OF LEEDS, ENGLAND.

COMBING COTTON AND OTHER FIBROUS MATERIAL.

Specification of Letters Patent No. 11,199, dated June 27, 1854.

*To all whom it may concern:*

Be it known that I, JAMES NOBLE, of Leeds, in the county of York, England, manufacturer, a subject of the Queen of Great Britain, have invented or discovered a new and useful Improvement in Preparing Cotton and Other Fibers; and I, the said JAMES NOBLE, do hereby declare the nature of the said invention and in what manner the same is to be performed to be particularly described and ascertained in and by the following statement thereof, reference being had to the drawing hereunto annexed and to the figures and letters marked thereon—that is to say, this invention consists of combining two rotating rings of comb or suitably formed teeth, one ring of teeth rotating within the other, but eccentric thereto so that at or near one point of the revolutions of the two rings they come nearly or quite together or in contact with one another. Above such rotating rings of teeth and on the axis of the inner of the two revolving rings there may be a circular frame carrying bobbins with prepared cotton or other fibers, and such prepared fibers are to be caused to descend to and come between two surfaces and upon brushes by which they may be placed into the teeth of the revolving rings while they are in rotation just in rear of the point where they come together. Where the rings come together the fibers are drawn from between the teeth of the rings by drawing rollers. As the distance apart of the peripheries of two revolving rings increases the long fibers remaining in the rings will be retained in the teeth of one of the rings (viz. the outer ring) and the teeth of the other ring will retain the shorter fibers which may be removed by a brush. The longer fibers so carried around are lifted out of the teeth and again placed into the teeth of the two rings and come again to be drawn off by the rollers. I prefer to use circular rings of teeth but it is not essential that they should be circular so long as they are formed to come together and to separate as explained. And in order that my invention may be more fully understood and readily carried into effect I will proceed to describe the means pursued by me.

*Description of the drawings.*—Figure 1 shows a plan, Fig. 2 a side elevation, and Fig. 3 a transverse vertical and central section of mechanism suitably arranged for carrying out my improvements in preparing cotton and other fibers.

The nature of this description of machinery being well understood by persons engaged in such manufactures, I have only thought it necessary to show so much of a machine as will enable a competent workman to understand my present improvement, he being able to apply such additional mechanism as may be desirable to complete the preliminary or succeeding operations of preparing the fibrous materials, such apparatus being well understood and in common use.

In the said drawings $a$, $b$, are two rings of comb or suitably formed teeth, they being made to rest and revolve upon the fixed bed or table $c$. The ring $a$ revolves within the ring, $b$, but is eccentric thereto, so that at one or near one point, the comb teeth, upon the rings $a$, $b$, approach toward and then recede from each other. The said rings $a$, $b$, are caused to revolve in the following manner: $d$ is a pinion carried by the vertical shaft or axis $d'$ supported by suitable bearings on the bed or framing of the machine and made to receive rotary motion from a steam engine or other motive power suitably applied to it. The pinion $d$, takes into and drives a toothed rim or gear $a^2$, $a^2$, formed on the outer circumference of the ring $b$. There are teeth, $b^2$, $b^2$, formed on the circumference of the ring $a$ and made to engage with a toothed gear $c^2$, fixed on an upright shaft $d^2$, carrying another gear $e^2$. The said gear $e^2$, engages with a connection gear $f^2$, which in its turn is made to engage with a gear $g^2$, fixed on the shaft $d'$.

Above the two rings and where they come together there may be a circular frame carried by and made to revolve freely on the fixed vertical axis $f$, which may be extended upward sufficiently therefor. The said frame may be caused to support and carry the bobbins of cotton or other fibers to be submitted to the action of the machine, such fibers being conducted from their bobbins in the form of slivers and led between the bars $g$, $h$, carried by the levers $i$, $i$, which are respectively supported on pin joints at the upper ends of levers $j$ $j$. The fulcra of the said levers $j$ $j$ are respectively supported by arms $k$ $k$ fixed to and carried by the inner circumference of the ring $a$. Each of the bars $g$ is connected to its bar $h$ by two pins $k^2$, $k^2$, which being attached to the bar $g$ at or near its two ends pass and slide freely through holes in the ends of the bar $h$. Each of the said pins is connected to a spiral spring $g'$, whose lower end is fixed to a strut $l^2$. When the outer arms of the levers $i$, together with the bars $g$, $h$ are raised as they may be by the action of a stationary cam $l$, fixed on a stationary shaft $f$, the two bars $g$, $h$ will be drawn together and will hold or pinch the sliver of cotton or other fibrous material extending between them and while they are moved outward by a stationary cam $m$ fixed on the stationary shaft $f$ and made to act on the lower ends of the levers $j$, $j$. The lower bars $h$ have brushes $m^2$ $m^2$ projecting from them, by which brushes the cotton or other fibers are raised out of the teeth of the ring $a$, and are carried forward into a position over the teeth of the two rings, $a$, $b$, just previous to their coming in contact. The cotton or other fiber is next pressed down into the teeth of the two rings by a brush carried by a lever as is well understood. The ends of the fibers projecting from the teeth of the ring, $b$, in their further revolution come in contact with and are drawn off by drawing-off rollers $n$, $n$, which are of the ordinary description. The rings in their further revolution will separate and the noils or short fibers will be left in the teeth of the ring, $b$, and may be removed by a brush or otherwise. The long ends of the fibers retained in the ring $a$, having been drawn through the teeth of the ring, $b$, will then be raised or lifted out by the action of the cam on the levers $i$ $i$ and the bars $g$, $h$, and will be again placed over the teeth of the two rings when they approach each other and so on in succession. The frame which carries the bobbins of prepared cotton or other fibers should revolve at the same speed as the ring $a$. To each of the lower arms of the levers $j$, $j$, a spring $o^2$ is affixed, it being also affixed to a ring on the shaft $f$. These springs serve to keep the levers close against the periphery of their cam. I do not limit my machine to the use of two brush levers, $i$, $i$, as any number may be used that can be accommodated in the machine, the brushes being made to extend entirely around within the circumference of the inner toothed ring if desirable.

Having thus described the nature of my invention and the manner of performing the same, I would have it understood that I do not confine myself to the precise details herein shown and described so long as the peculiar character of my invention be retained; but

What I do claim for the purpose of operating upon fibrous material in the manner as set forth and in combination with brushes and draw rollers, or their equivalents—

The combining of two rotating rings of teeth, so that not only shall one rotate in and be eccentric to the other, but so that at or near one point of the revolutions of the two rings they shall come nearly or quite together or in contact with each other substantially as specified; such rings by their coöperation in the manner set forth being made to separate the long from the short fibers of the material when subjected to their action as explained.

In testimony whereof I have hereunto set my signature this twenty-second day of February, in the year of our Lord one thousand eight hundred and fifty-four.

JAMES NOBLE.

Witnesses:
ALBERT GARY,
JOHN CROFTS.